US011297466B1

(12) United States Patent
Nies

(10) Patent No.: US 11,297,466 B1
(45) Date of Patent: Apr. 5, 2022

(54) SYSTEMS FOR PREDICTING AND CLASSIFYING LOCATION DATA BASED ON MACHINE LEARNING

(71) Applicant: Allstate Insurance Company, Northbrook, IL (US)

(72) Inventor: Anne Nies, Carson, WA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/857,788

(22) Filed: Apr. 24, 2020

(51) Int. Cl.
*H04W 4/029* (2018.01)
*G06N 20/00* (2019.01)
*H04W 64/00* (2009.01)
*G06F 16/29* (2019.01)

(52) U.S. Cl.
CPC ............ *H04W 4/029* (2018.02); *G06F 16/29* (2019.01); *G06N 20/00* (2019.01); *H04W 64/003* (2013.01)

(58) Field of Classification Search
CPC ... H04W 4/029; H04W 64/00; H04W 64/003; H04W 4/02; H04W 4/021; H04W 8/02; H04W 8/06; H04W 8/065; H04W 8/08; H04W 40/38; H04W 48/04; G06F 16/29; G06F 16/28; G06F 16/38; G06F 16/383; G06F 16/387; G06F 16/487; G06F 16/43; G06F 16/5866; G06F 16/587; G06F 16/687; G06F 16/686; G06N 20/00
See application file for complete search history.

(56) References Cited

U.S. PATENT DOCUMENTS

| 8,024,112 | B2 | 9/2011 | Krumm et al. |
| 8,229,458 | B2 | 7/2012 | Busch |
| 8,509,860 | B2 | 8/2013 | Heshmati |
| 8,855,901 | B2 | 10/2014 | Leader et al. |
| 8,949,013 | B2 | 2/2015 | Yang et al. |
| 9,277,362 | B2 | 3/2016 | Li |
| 9,303,997 | B2 | 4/2016 | McGavran et al. |
| 9,488,487 | B2 | 11/2016 | Andersen |
| 9,589,270 | B2 | 3/2017 | Weiss et al. |

(Continued)

OTHER PUBLICATIONS

S. Sridhar Raj et al, Ensemble human movement sequence prediction model with Apriori based Probability Tree Classifier (APTC) and Bagged J48 on Machine learning, Journal of King Saud University—Computer and Information Sciences, 2018, pp. 1-9.

(Continued)

*Primary Examiner* — Meless N Zewdu
(74) *Attorney, Agent, or Firm* — Dinsmore & Shohl LLP

(57) ABSTRACT

Systems and methods can use a variety of computing devices to obtain location data that can be used to generate a prediction of a likelihood that a person will move his or her residence. The location data can be generated based on location data captured from a mobile computing device and/or based on telematics data captured during the operation of a vehicle and/or from a computing device. The location data may be compiled into graphs comprising locations of visited by the person and relationships between the locations visited by the person, such as instances of the person traveling between the two locations. The likelihood to change residence can be determined based on the amount of time the person spent at a given location, the distance between the various locations that are the most significant in the graph, and/or the frequency of visits to particular locations.

20 Claims, 5 Drawing Sheets

(56) References Cited

U.S. PATENT DOCUMENTS

| | | | |
|---|---|---|---|
| 9,594,791 | B2 | 3/2017 | Bell et al. |
| 9,843,895 | B2 | 12/2017 | Huang et al. |
| 9,886,683 | B2 | 2/2018 | Lazarus et al. |
| 2010/0004004 | A1 | 1/2010 | Browne-Swinburne et al. |
| 2010/0262362 | A1* | 10/2010 | Naito et al. ............... 701/204 |
| 2012/0088525 | A1* | 4/2012 | Kurokawa et al. ........ 455/456.5 |
| 2012/0143882 | A1* | 6/2012 | Zheng et al. ............... 707/751 |
| 2013/0053066 | A1* | 2/2013 | Khorashadi et al. ...... 455/456.2 |
| 2013/0090964 | A1 | 4/2013 | Rivere |
| 2013/0262479 | A1 | 10/2013 | Liang et al. |
| 2014/0278086 | A1 | 9/2014 | Filippo et al. |
| 2015/0094021 | A1* | 4/2015 | Su ......................... H04W 48/04 |
| 2015/0237470 | A1* | 8/2015 | Mayor et al. ......... H04W 4/021 |
| 2016/0069695 | A1 | 3/2016 | Broadbent et al. |
| 2017/0238145 | A1* | 8/2017 | Ferrell et al. ......... H04W 4/028 |
| 2018/0089227 | A1* | 3/2018 | Reddy et al. ..... G06F 17/30241 |
| 2019/0327579 | A1* | 10/2019 | Rankin, V et al. ... H04W 4/029 |
| 2020/0196104 | A1* | 6/2020 | Wirola et al. ......... H04W 4/029 |
| 2021/0168560 | A1* | 6/2021 | Moridi et al. ........ H04W 4/029 |

OTHER PUBLICATIONS

Daniel Ashbrook et al., Using GPS to Learn Significant Locations and Predict Movement Across Multiple Users, College of Computing Georgia Institute of Technology Atlanta, GA, 2013, 15 pages.

Abdulrahman Al-Molegi et al., Move, Attend and Predict: An Attention-based Neural Model for People's Movement Prediction, Pattern Recognition Letters, May 2018, pp. 1-8.

Neelabh Pant et al, Detecting Meaningful Places and Predicting Locations Using Varied K-Means and Hidden Markov Model, University of Texas at Arlington, 2017, 8 pages.

Dominic Kohler, Predicting future locations of mobile users using hybrid features, University of Bern, Switzerland, 2018, 52 pages.

\* cited by examiner

US 11,297,466 B1

SYSTEMS FOR PREDICTING AND CLASSIFYING LOCATION DATA BASED ON MACHINE LEARNING

FIELD OF USE

Aspects of the invention relate to data processing and more specifically to predicting and classifying location data based on machine learning.

BACKGROUND

A person may change his or her residence, for instance by moving from one geographic location to another. It may be desirable to proactively identify a move (e.g., without user input) in order to execute one or more modifications to user data to maintain accuracy.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Currently, it is difficult to predict if or when a person will change his or her residence. As a result, it is not currently possible to predictively identify a move and/or update user data records. Accordingly, there is a need to accurately predict if and when a person is planning to move his or her residence. Systems and methods described herein can use a variety of computing devices to obtain location data that can be used to generate a prediction (e.g., based on machine learning) of a likelihood that a person will move his or her residence. The location data can be generated based on location data captured from a mobile computing device and/or based on telematics data captured during the operation of a vehicle. The location measurement may include global navigation satellite system (GNSS) data, such as Global Positioning System (GPS) data generated by a GPS receiver or may comprise other location data, such as mapping information captured by one or more applications executing on a computing device. A computing device may compile the location data into graphs comprising edges and nodes. The nodes may represent locations visited by the person. The edges may represent a relationship between two of the locations visited by the person, such as instances of the person traveling between the two locations.

In several embodiments, machine classifiers are trained based on training data comprising location data and/or graph data representing instances of ground truth in which a person changed the location of his or her residence. After a machine classifier has been trained, the machine classifier may take a graph representation of location data as input data, and, based on the input data, may output a prediction of a likelihood that a person will change his or her residence.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
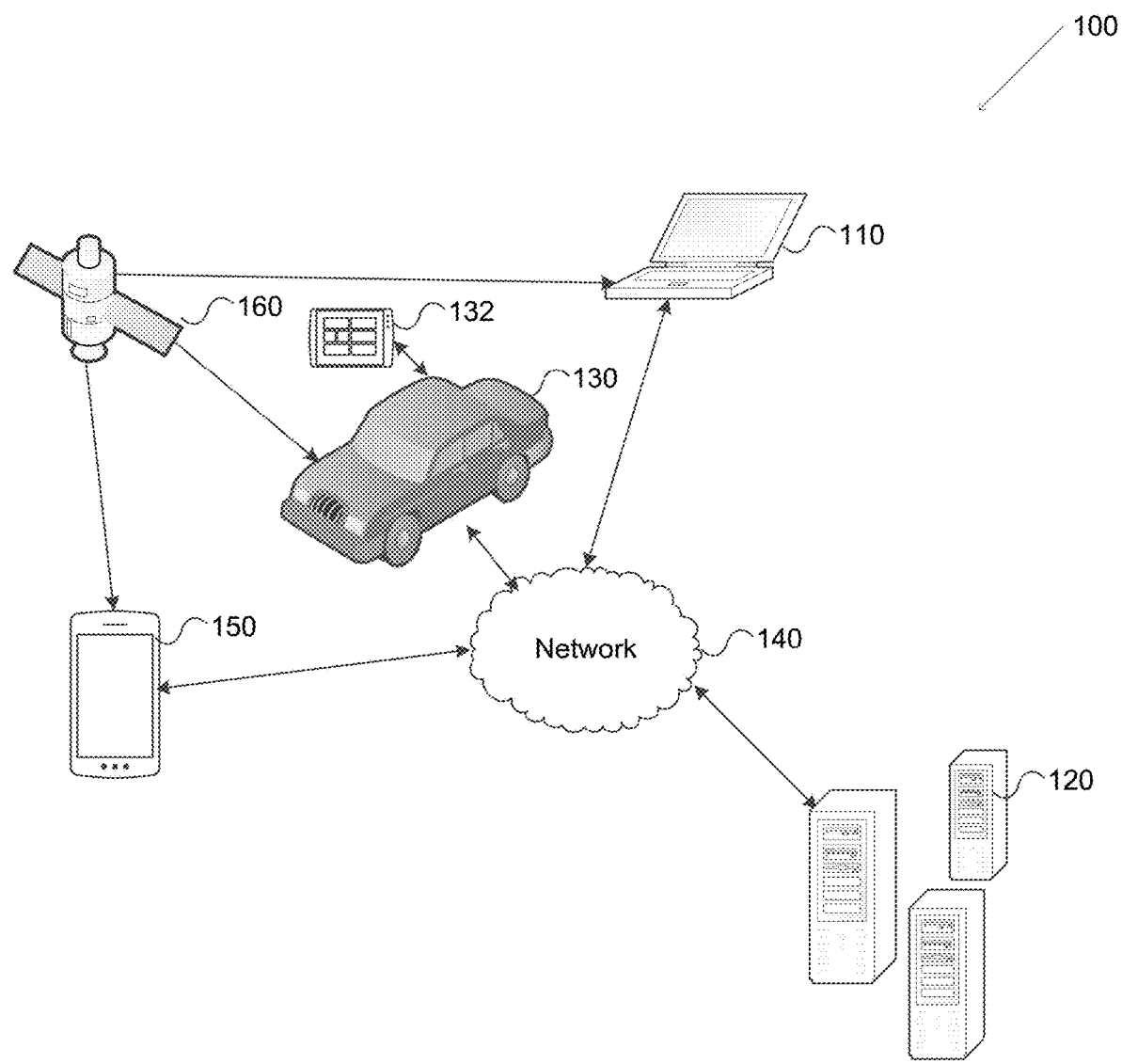
FIG. 1 illustrates an example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

Aspects described herein relate to classifying location data associated with a person to predict whether the person will change his or her residence. The location data can be generated or obtained based on telematics data or other telemetry data associated with a person's location (e.g., based on position or location data captured by a device associated with a user). According to some embodiments, the telematics data may be captured during the operation of a vehicle in which the person travels. In several embodiments, the telematics data is captured using a computing device, such as a mobile device or smartphone, associated with a driver of the vehicle.

Based on the location data, a computing device may generate a graph representation of the location data. In several embodiments, the computing device may train one or more machine classifiers to classify features within location graphs based on ground truth graphs of location data that have been labeled as a person who has changed his or her residence, or has not changed his or her residence. The machine classifier may determine a person's likelihood to change his or her residence based on the amount of time the person spent at a given location represented by a location on the graph and the distance between the various locations that are the most significant in the graph. The machine classifier may also determine a person's likelihood to change his or her residence based on the frequency with which a person travels between various locations represented by locations on a graph.

These and various other arrangements will be described more fully herein. As will be appreciated by one of skill in the art upon reading the following disclosure, various aspects described herein can be embodied as a method, a computer system, and/or a computer program product. Accordingly, those aspects can take the form of an entirely hardware embodiment, an entirely software embodiment, and/or at least one embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Operating Environments and Computing Devices

FIG. 1 illustrates an operating environment 100 in accordance with at least one embodiment of the invention. The operating environment 100 includes at least one client device 110, at least one classification server system 120, at least one vehicle 130 with a telematics device 132, at least one mobile computing device 150, and/or at least one GPS receiver 160 in communication via a network 140. Any of the devices and systems described herein can be implemented, in whole or in part, using one or more computing devices described with respect to FIG. 2.

Client devices 110, classification server systems 120, mobile computing device 150, and/or GPS receiver 160 can allow for users to obtain location data (for instance in the form of telematics data from vehicles 130, location data captured via mobile computing device 150, or the like), generate trips, and/or classify trips, vehicles, and/or drivers as described herein. The network 140 can include a local area network (LAN), a wide area network (WAN), a wireless telecommunications network, and/or any other communication network or combination thereof.

Vehicle 130 can be, for example, an automobile, motorcycle, scooter, bus, recreational vehicle, boat, or other vehicle for which sensor or crash data can be collected and analyzed. A telematics device 132 within the vehicle 130 can be used to collect and/or receive sensor data from the vehicle 130. Telematics device 132 can process the data to detect a crash or non-crash event and/or transmit the sensor or crash data to the classification server system 120 or other computing devices. Telematics device 132 can be, for example, mobile phones, personal digital assistants (PDAs), tablet computers, laptop computers, smartwatches, and other devices that can be carried by drivers or passengers inside or outside of the vehicle 130. Telematics device 132 can also be integrated into the vehicle 130 and/or connected to a data bus within the vehicle 130 via a diagnostic connector, such as an OBD-II connector. Certain telematics devices 132 can receive a variety of data, such as acceleration, velocity, location, vehicle operation data such as braking, turning, swerving, and the like from sensors located within telematics device 132 and/or vehicle. For example, a telematics device 132 having a Global Positioning System (GPS) receiver can determine vehicle location, speed, direction, and other basic driving data without needing to communicate with vehicle sensors or external vehicle systems. However, it should be noted that any of a variety of other location determination techniques, such as location determined based on wireless networks to which the mobile device is connected, such as Wi-Fi networks, cellular networks, and the like, can also be used. The sensors of telematics device 132, such as a GPS and/or a compass, can sense the speed and/or direction at which telematics device 132 (and accordingly vehicle 130 when the telematics device 132 is located in vehicle 130) is traveling. An accelerometer of telematics device 132 can sense the acceleration of the mobile device. A gyroscope can be used to determine the orientation of the mobile device. In some aspects, orientation can be detected, for example, at a rate of 90 Hz. The gyroscope can also be used to measure the speed of rotation of telematics device 132. A magnetometer can be used to measure the strength and direction of the magnetic field relative to telematics device 132. The data collected by telematics device 132 can be stored and/or analyzed within telematics device 132. The processing components of telematics device 132 can be used to analyze sensor data. Additionally or alternatively, telematics device 132 can transmit, via a wired or wireless transmission network, the data to one or more computing devices for storage and/or analysis.

Vehicle 130 can further include a short-range communication system. The short-range communication systems can be vehicle-based data transmission systems configured to transmit vehicle operational data to other nearby vehicles, and to receive vehicle operational data from other nearby vehicles. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, Bluetooth, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device (e.g., telematics device 132) within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, rail road crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast a variety of data to an intermediate station which can then relay the information to one or more computing devices.

The types of vehicle operational data, vehicle driving data, or the like, transmitted to or from vehicle 130 and/or infrastructure can depend on the protocols and standards used for the V2V or V2I communication, the range of communications, and other factors. In certain examples, vehicle 130 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as, but not limited to, a detection by the vehicle's internal systems that the vehicle is skidding, that an impact has occurred, or that the vehicle's airbags have been deployed, and that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system.

The data transferred to and from various devices in operating environment 100 can include secure and sensitive data. Therefore, it can be desirable to protect transmissions of such data using secure network protocols and encryption, and also to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. In some systems, web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices described herein such that any external devices can communicate directly with the specialized hardware.

It will be appreciated that the network connections shown are illustrative and that other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
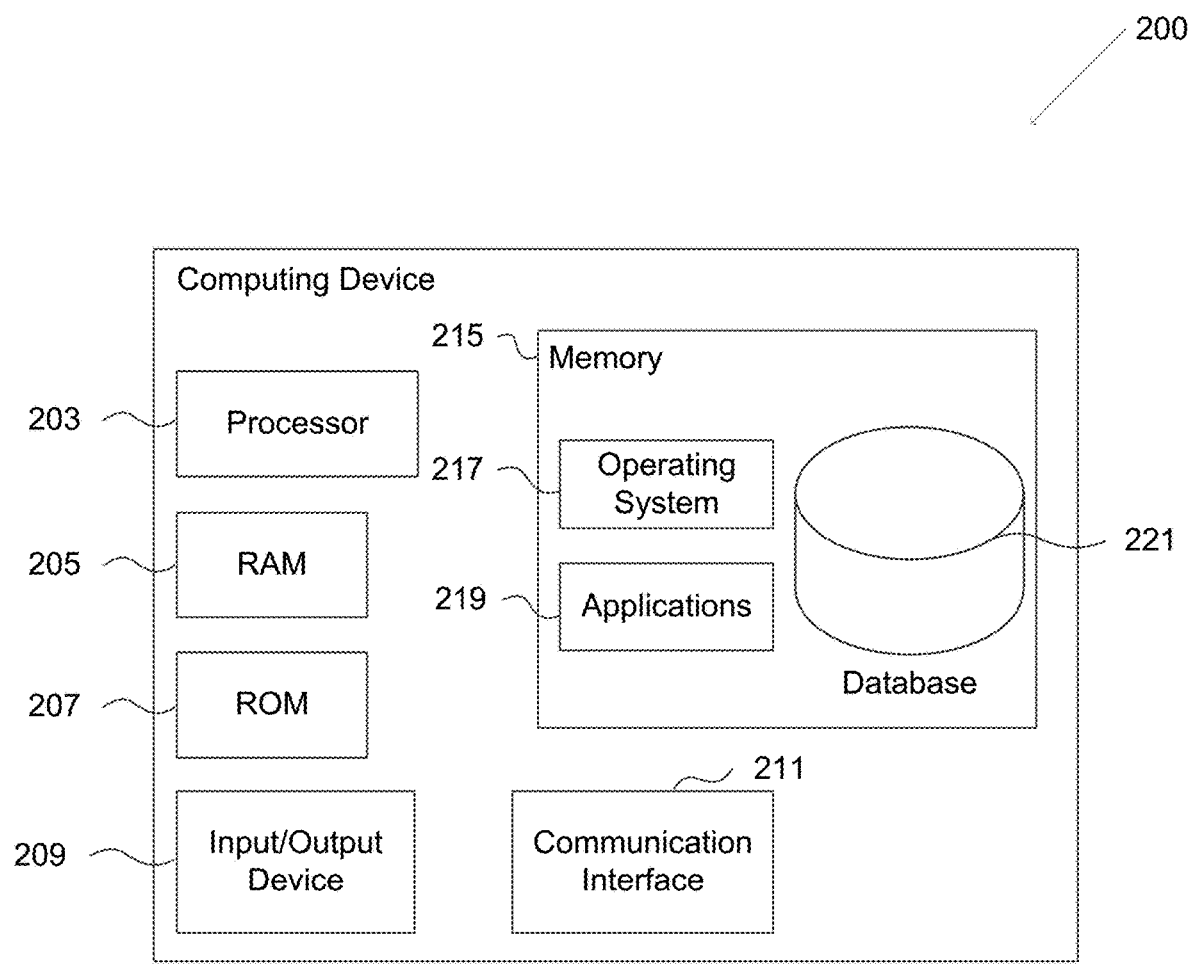
FIG. 2 illustrates an example computing device in accordance with one or more aspects described herein.

Turning now to FIG. 2, a computing device 200 in accordance with at least one embodiment of the invention is shown. The computing device 200 can include a processor 203 for controlling overall operation of the computing device 200 and its associated components, including RAM 205, ROM 207, input/output (I/O) device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203, allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Classifying Location Data

Figure 3:
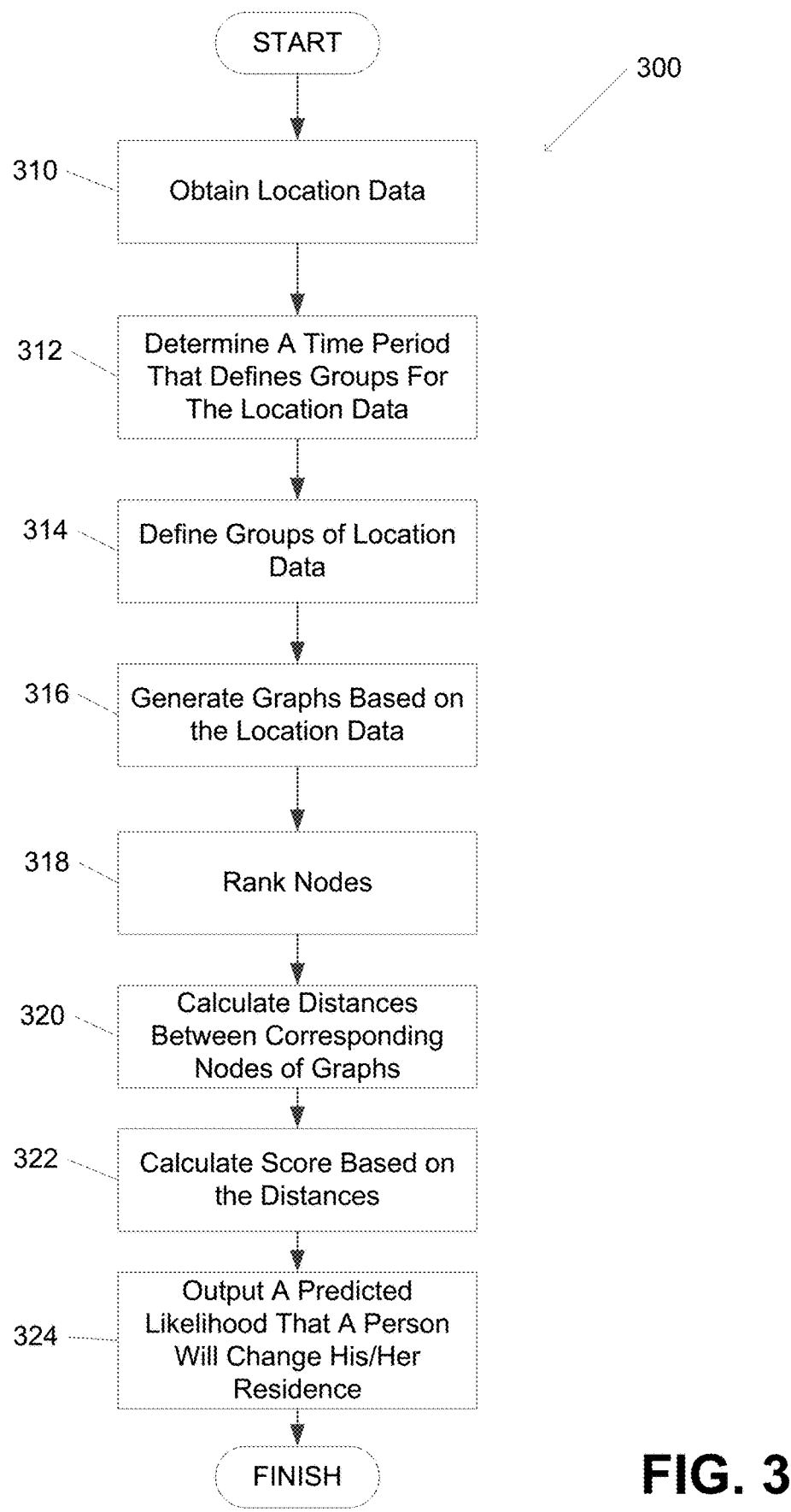
FIG. 3 is a flow chart illustrating a process for predicting a likelihood that a person will change his or her residence in accordance with at least one embodiment of the invention.

FIG. 3 is a flow chart illustrating a process for classifying location data in accordance with at least one embodiment of the invention. Some or all of the steps of process 300 can be performed using any of the computing devices and/or combination thereof described herein. In a variety of embodiments, some or all of the steps described below can be combined and/or divided into sub-steps as appropriate.

At step 310, location data indicative of a person's movements among various geographic locations can be obtained. In some embodiments, the location data may be obtained from a computing device that is associated with the person, such as a smartphone or other mobile computing device. The location data may be obtained, for example, from an application running on the computing device. Such applications may comprise mapping applications, search applications, and may take various other forms as well. In some examples, the location data may be GPS data captured via the computing device.

In various embodiments, the location data associated with the person can be telematics data obtained from a telematics device associated with a vehicle that is also associated with the person. The telematics device can be installed in the vehicle and/or can be a mobile device associated with one or more persons in the vehicle (e.g., driver, passenger, etc.). The telematics data can include acceleration data, speed data, braking data, heading data, geographic data, impact data, data identifying the vehicle and/or passengers, and/or any other data as appropriate. The obtained telematics data can also include data captured using multiple telematics devices and/or telematics devices associated with other vehicles and/or locations proximate to the vehicle. The telematics data can include a subset and/or an aggregation of raw sensor data captured using the sensors associated with the telematics device. In a variety of embodiments, the telematics data includes a stream of raw sensor data captured using the telematics device.

The location data may take various forms. For instance, according to some embodiments, the location data may take the form of GPS (Global Positioning System) coordinate data. The location data may also comprise timestamp data that indicates the times at which the person visited the location specified by the GPS coordinate data, an identifier of the device that captured the location data, and/or an indication of an identity of the person associated with the location data. The location data may take various other forms as well.

According to various embodiments, the location data may comprise ground truth location data, also referred to as "training data." The training data may be labeled to indicate whether or not a person changed his or her residence. The training data may be used to train a machine classifier (discussed in greater detail herein, for instance with respect to step 324 and elsewhere) to predict a likelihood that a person will change his or her residence.

At step 312, a time period that defines groups for the location data may be determined. Such a time period may be a day, week, month, or another time period. The time period for defining groups of location data may be defined in various manners, for example, statically, dynamically (for instance, based on machine learning techniques) or in various other manners as appropriate.

At step 314, groups of the location data may be defined. Based on the time when the location data was captured (e.g., timestamps collected as part of the location data) and the time period for grouping the location data (e.g., described above with respect to step 312), the computing device may place location data into a corresponding group. For instance, if the time period is one week, and location data is collected across a two week timespan, a computing device may define a first group that includes location data for the first week and a second group that includes location data for the second week. The computing device may collect location data captured during the first week into the first group, and may collect location data captured during the second week into the second group.

At step 316, a graph representation of the location data associated may be generated for each group of location data. A computing device may generate each graph representation. The process of generating the graph representation of the location data for a given group of location data may take various forms, which will now be described in greater detail.

At a high level, the generated graph may comprise a set of nodes (also referred to as vertices) that are interconnected by a set of edges that define the interconnections between the nodes. The computing device may generate a graph for each group of location data. Each node may correspond to a geographic location visited by a person, which may be represented by a set of GPS coordinates obtained from the location data. Each edge may represent a connection between two sets of GPS coordinates represented by two corresponding nodes. The connection represented by each edge indicates that the person traveled between the geographic locations represented by the corresponding connected nodes.

As an example, in a graph, a first node (labeled "A") may correspond to a first location that a person visited and that is specified by the GPS coordinate pair (41.8662, −87.6192), and a second node (labeled "B") may correspond to a second location that the person visited and that is specified by the GPS coordinate pair (41.8670, −87.6193). If the person has traveled between the first and second locations, then an edge connects nodes A and B to represent the connection between the two locations in the graph.

According to some embodiments, a computing device may treat location data from multiple nearby locations as originating from the same single location. For example, if location data is obtained from multiple locations within a threshold distance (e.g., locations within 1 km of each other), the computing device may treat those pieces of nearby location data as originating from the same location, such as a landmark near the nearby locations or a geographic center of the nearby locations.

According to some embodiments, auxiliary data such as a Point of Interest (POI) database, may be used to map GPS coordinate location data corresponding to known landmarks (e.g., a business home, store, etc.). By relating GPS coordinate data to known landmarks or addresses, the computing device may be able to improve the accuracy of the predicted likelihood that a person will move or has moved his or her residence. For example, if location data indicates that a person begins spending a significant amount of time at a previously unvisited residence, or locations within a predefined distance of a previously unvisited residence, this information may be used to determine a greater likelihood that the person will move or has moved his or her residence. Whereas, if location data indicates that a person spent more time at a commercial location, the change in time spent may indicate that the person has changed jobs, and not that the person has moved his or her residence. It should be understood that the preceding are just some examples of how GPS data may be mapped to known landmarks to improve predictions that a person will move his or her residence. The computing device may use such mappings in various other manners as well.

The amount of time within a given time period that a person has spent at or near each location represented by a particular node may also be determined and associated with the corresponding node. For a given node corresponding to a particular location, the computing device may calculate the time that the person has spent at or near the location corresponding to the node over the time period. For example, based on timestamps associated with location data, the computing device may determine that a person has spent 10 hours at the location corresponding to node A, and has spent 8 hours at the location corresponding to node B. The computing device may associate the time spent at each location with the node corresponding to that location. The amounts of time that a person spent at different locations that are associated with corresponding nodes representing the locations may be determined in various other manners as well.

At step 318, the nodes in each graph are ranked based on the time the person spent at the location corresponding to each node. For example, a computing device may determine that a person spent 12 hours at the location corresponding to node B, 10 hours at the location corresponding to node A, 6 hours at the location corresponding to node C, and 5 hours at the location corresponding to node D. Thus, the person spent the most time at node B, followed by nodes A, C, and D (in that order), and based on this determination, the computing device may rank the nodes in that order. The ranking process may be repeated for each graph of each time period.

At step 320, the distances between corresponding nodes of a first graph and a second graph are calculated. The process of calculating the distance between corresponding nodes of the first and second graphs may take various forms. For instance, the computing device may identify the first and second graphs by identifying a second graph that belongs to a time period that is immediately subsequent to the first graph.

As an example, if the time period of data represented in each graph is equal to one week, the computing device may identify a first graph for a first week, and may identify the second graph by identifying a graph for the week immediately after the first week. In a variety of embodiments, the computing device may identify each graph by selecting it from a graph database. The graph database may allow easier retrieval and search of the data associated with each graph. The process of identifying the first and second graphs may take various other forms as well.

To calculate distances between corresponding nodes, corresponding nodes between the first and second graphs may first be identified. The corresponding nodes between the first and second graphs may be identified based on the corresponding rankings of the nodes (as described in greater detail with respect to step 318). The distances between the correspondingly-ranked nodes may be calculated as the distance between the locations corresponding to the top-ranked nodes (where the person spent the most time) in the first and second graphs, the distance between the locations of the second-ranked nodes in the first and second graphs, and so on. According to some embodiments, the distance between each node may be calculated by calculating the haversine distance (which determines the great-circle distance between two points on a sphere given the longitudes and latitudes of two points) between the corresponding locations of each corresponding ranked node. The distance between the corresponding locations of two nodes may be calculated in various other manners as well, such as calculating the actual driving distance.

Whenever the distances between correspondingly-ranked nodes (and especially highly-ranked nodes where a person spends a great deal of time) change significantly, this change in distance(s) may indicate that a person is likely to move his or her residence. For example, if in a given current time period, a person spends a significant amount of time at or near a new location that the person did not visit in the previous time period, the time spent visiting the new location may indicate that the person visited a potential new home, as well as lawyers, schools, shops, and/or restaurants in the area around the potential new home. In such a case, a node corresponding to the new location would be highly ranked in a graph for the current time period due to the significant amount of time spent at the new location. There would also be a non-zero distance between the node corresponding to the new location, and the location of the correspondingly-ranked node for the previous time period, which may indicate that the person is planning to move his or her residence. This distance may be input to a machine classifier (described in greater detail with respect to step 324) that may use the distance to determine a predicted likelihood that a person is likely to move his or her residence.

According to various embodiments, the calculated distance between each node may be input into a regularization function that reduces the noise of the calculated distances, and which outputs a regularized distance. The regularization function may take various forms. According to some embodiments, the regularization function may be defined according to the following pseudocode:

if d<=0.5:0
else: log(d+0.5)/(Rank+1)

In the above formula, the regularized output distance of the regularization function is equal to 0 for distances (d) less than or equal to 0.5 km. Otherwise, the regularized distance is equal to the logarithm of: the quantity of the input distance (d)+0.5 divided by the quantity of the node rank+1. The above formula ignores distances less than 0.5 km and places heavier scores on higher-ranked nodes (based on the amount of time spent at the node), and lower scores on lower-ranked nodes (where the person spent less time). The regularization function may be defined in various other manners as well.

At step 322, a score may be calculated based on the distances between the corresponding nodes in the first and second graphs. The score may be calculated in various manners. For instance, the score may be calculated based on the regularized distances calculated between corresponding nodes of the first and second graphs (described above with respect to step 320). According to some embodiments, the score may be calculated as the sum total of the regularized distances between corresponding nodes of the first and second graphs. The score may take various other forms as well.

Figure 4:
FIG. 4 is a table of example node ranks and corresponding geographic locations according to one or more aspects described herein.

Turning now to FIG. 4, a table 400 is illustrated. Table 400 provides examples of node ranks and corresponding geographic locations for two graphs representing the month of June and the month of July, respectively. Table 400 also includes examples of haversine distances and regularized distances between the corresponding nodes of each graph, as well as an example score that is calculated as the sum of the regularized distances.

With further reference to FIG. 3, at step 324, the score may be input to a machine classifier, which outputs a predicted likelihood that a person will change or has changed (e.g., without notification from the person or user) his or her primary residence. The machine classifier may take various forms and may generate the prediction using various techniques.

According to some embodiments, the machine classifier may take the form of a logistic classifier. A logistic classifier is a machine learning technique can be used to determine the probability that a sample falls into one of two classes (such as will move and will not move). Such a logistic classifier may be trained to model the probability that a person will move his or her residence based on training data obtained during a training phase. The logistic classifier may be trained with training data comprising graphs of location data, distances between nodes of each graph, and/or scores defined by a regularization function. The training data is labeled to indicate whether a person was known to have moved or not to have moved his or her residence (as described with respect to step 310). Based on the training data, the logistic classifier may perform a technique, such as gradient descent, to generate a logistic function that predicts a likelihood that a person will move based on input data comprising graph data, distance data, and/or score data.

The trained logistic classifier may take graph data, the corresponding location data, distances, and/or score data (as described with respect to step 320) as input, and based on a regression analysis of such input data (such as logistic regression analysis using the previously defined logistic function), may generate a predicted likelihood that the person will move or has moved his or her residence as an output.

It should be understood that a logistic classifier is just one form of classifier that may generate such an output probability, and that the machine classifier may take various other forms. For example, a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions. A machine classifier can be trained based on historical location data and ground truth labels indicating whether the location data corresponded with a person moving his or her residence. A variety of additional data, such as location data, distance data (calculated between corresponding nodes of graphs), and/or regularization function score data, can also be included in the training of the machine classifier. In several embodiments, training the machine classifier includes automatically updating one or more weights associated with neurons within one or more layers of a machine learning model utilized by the machine classifier to generate probabilistic likelihoods of location data being associated with a particular likelihood of a person changing his or her residence or that a person has changed his or her residence. In many embodiments, the machine classifier can be retrained using the classified location data and/or an obtained ground truth label indicating if the user actually moved their residence. In this way, the machine classifier can be continuously improved based on newly obtained location data.

Various actions may be taken based on the predicted likelihood that the person will move or has moved his or her residence. These actions may take various forms. As one example, advertising (e.g., for common products, services, or the like, that a person who is moving or has recently moved may need or desire) may be targeted and sent to a computing device associated with the person if the model predicts that the person is likely to move his or her residence or is likely to have recently moved. For instance, products and services such as carpet cleaning, painting, flooring, remodeling services, plumbing, and the like, may be identified and forwarded to the user (e.g., via the user computing device).

As another example, the outputted probability of the classifier may be further combined with various data sources that provide additional data associated with the person. These data sources may take various forms, such as sources of credit score data, sources of real estate application data usage (e.g., how often the person has visited real estate websites), sources of mortgage data (which may indicate whether the person has applied or will apply for a mortgage), and various other forms as well. By combining the data from these data sources with the output probability of the classifier, the predicted likelihood may be adjusted to more accurately predict whether the person will move or has moved his or her residence.

As still another example, the predicted likelihood output by the machine classifier may be combined with a retention model that may predict a likelihood that a person will retain a service, for example a subscription service, such as an insurance service, etc. By combining the predicted likelihood of the machine classifier with the output of the retention model, the computing device may more accurately identify when advertising should be targeted to the person to avoid the person canceling his or her service. The predicted likelihood output of the machine classifier may be combined with various other models as well.

Figures 5A, 5B:
FIGS. 5A-5B are conceptual diagrams illustrating changes in location represented by two graphs in accordance with at least one embodiment described herein.

Turning now to FIGS. 5A-5B, two conceptual diagrams 510 and 520 of nodes 502, 504, and 506 corresponding to various locations that a person visited during two periods of time are illustrated. According to various embodiments illustrated with respect to FIGS. 5A-5B, a computing device may predict that the person will move or has moved his or her residence based on the frequency with which the person visited each of the locations.

In the example illustrated in FIGS. 5A and 5B, node 502 may correspond to a person's home, node 504 may correspond to the person's workplace, and node 506 may correspond to a candidate home to which the person may move or has moved.

As illustrated in graph 510 of FIG. 5A, the person visited the locations corresponding to nodes 502, 504, and 506 during the time period before a particular date (e.g., May 1). And, as illustrated in graph 520 of FIG. 5B, the person visited the same locations corresponding to nodes 502, 504, and 506 after the particular date (e.g., after May 1). For each time period, nodes that the person visited most frequently are illustrated with solid fill. Nodes that the person visited less frequently are illustrated without fill.

Thus, in the period before May 1 illustrated in graph 510 of FIG. 5A, the person made more frequent trips between the locations corresponding to nodes 502 and 504 than between the locations corresponding to nodes 504 and 506. And, as illustrated in graph 520 of FIG. 5B, in the period after May 1, the person made more frequent trips between the locations corresponding to nodes 506 and 504 than between the locations corresponding to nodes 502 and 504.

Because the person more frequently traveled between nodes 502 and 504 before May 1 (as illustrated in FIG. 5A), and more frequently traveled between nodes 506 and 504 after May 1 (as illustrated in FIG. 5B), the change in frequency in the person's movement patterns illustrated in FIGS. 5A and 5B may indicate that the person is planning to change or has changed his or her residence.

According to various embodiments, the computing device may rank the nodes based on the frequency that the person traveled to the location corresponding to each node. The frequency with which the person traveled to the location corresponding to each node may be the sole metric for ranking the nodes in some examples. In other examples, the visitation frequency may be combined with the time that the person spent at each location, or may not be used as a metric for ranking the nodes. The visitation frequency may be used in various other manners.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled for execution, or can be written in a scripting language such as (but not limited to) python, JavaScript, or R. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for determining a change in residence, comprising:
 obtaining, by a computing device, location data indicating a set of geographic locations and a set of times that a person was at each of the geographic locations;
 generating, by the computing device and based on the location data, a first graph data comprising a first set of nodes and edges therebetween, and a second graph data comprising a second set of nodes and edges therebetween;
 ranking, by the computing device and based on amounts of time the person spent at a first set of geographic locations associated with the first graph data, the first set of nodes to produce a first set of ranked nodes;
 ranking, by the computing device and based on amounts of time the person spent at a second set of geographic locations associated with the second graph, the second set of nodes to produce a second set of ranked nodes;
 determining, by the computing device, geographic distances between the first set of geographic locations corresponding to the first set of ranked nodes and the second set of geographic locations corresponding to the second set of ranked nodes; and
 determining, by the computing device and based on the geographic distances, a predicted likelihood that the person will move a residence, wherein the predicted likelihood is determined using a machine learning classifier.

2. The method of claim 1, wherein determining the predicted likelihood comprises:
summing, by the computing device, the geographic distances to produce a sum of the geographic distances; and
determining, by the computing device, the predicted likelihood based on the sum of the geographic distances.

3. The method of claim 1, further comprising:
obtaining, by the computing device, a ground truth label indicating if the person moved the residence; and
retraining, by the computing device, the machine learning classifier based on the geographic distance, the predicted likelihood, and the ground truth label.

4. The method of claim 1, wherein the machine classifier comprises a logistic classifier.

5. The method of claim 1, further comprising:
regularizing, by the computing device, the geographic distances between the geographic locations to produce regularized distances; and
determining the predicted likelihood that the person will move the residence further comprises classifying a sum of the regularized distances to determine the predicted likelihood.

6. The method of claim 1, further comprising determining a frequency that the person visited the first set of geographic locations and a frequency that the person visited the second set of geographic locations, wherein the predicted likelihood that the person will move the residence is based on the frequency that the person visited the first set of geographic locations and the frequency that the person visited the second set of geographic locations.

7. The method of claim 1, wherein determining the predicted likelihood that the person will move the residence is based on the first set of ranked nodes and the second set of ranked nodes.

8. The method of claim 1, wherein the geographic distances comprise haversine distances.

9. The method of claim 1, further comprising:
obtaining data, by the computing device and from a data source, related to a likelihood that the person will move the residence; and
determining the predicted likelihood further comprises determining the predicted likelihood based on the geographic distances and the obtained data.

10. The method of claim 1,
wherein the first graph data comprises the first set of nodes and edges, each of the first set of nodes corresponds to a geographic location of the first set of the geographic locations that the person visited during a first time period, and each of the first set of edges indicates a connection between two of the first set of the geographic locations; and
wherein the second graph comprises the second set of nodes and edges, each of the second set of nodes corresponds to a geographic location of the second set of the geographic locations that the person visited during a second time period, and each of the second set of edges indicates a connection between two of the second set of locations.

11. A computing device for determining a change in residence, comprising:
a processor; and
memory storing instructions that, when executed by the processor, cause the computing device to:
obtain location data indicating a set of geographic locations and a set of times that a person was at each of the geographic locations;
generate a first graph data comprising a first set of nodes and edges therebetween, and a second graph data comprising a second set of nodes and edges therebetween;
rank, based on amounts of time the person spent at a first set of geographic locations associated with the first graph data, the first set of nodes to produce a first set of ranked nodes;
rank, based on amounts of time the person spent at a second set of geographic locations associated with the second graph, the second set of nodes to produce a second set of ranked nodes;
determine geographic distances between the first set of geographic locations corresponding to the first set of ranked nodes and the second set of geographic locations corresponding to the second set of ranked nodes;
determine, based on the geographic distances and with a machine classifier, a predicted likelihood that the person will move a residence;
obtain a ground truth label indicating if the person moved the residence; and
retrain the machine classifier based on the geographic distance, the determined predicted likelihood, and the ground truth label.

12. The computing device of claim 11, wherein the instructions that cause the computing device to determine the predicted likelihood further comprise instructions that, when executed by the one or more processors, further cause the computing device to:
sum the geographic distances to produce a sum of the geographic distances; and
determine the predicted likelihood based on the sum of the geographic distances.

13. The computing device of claim 11, wherein the machine classifier comprises a logistic classifier.

14. The computing device of claim 11, wherein the instructions, when executed by the one or more processors, further cause the computing device to:
regularize the geographic distances between the first set of geographic locations corresponding to the first set of ranked nodes and the second set of geographic locations corresponding to the second set of ranked nodes to produce a set of regularized distances, and
classify a sum of the regularized distances to determine the predicted likelihood.

15. The computing device of claim 11, wherein the instructions, when executed by the one or more processors, further cause the computing device to determine a frequency that the person visited the first set of geographic locations and a frequency that the person visited the second set of geographic locations, wherein the predicted likelihood that the person will move the residence is based on the frequency that the person visited the first set of geographic locations and the frequency that the person visited the second set of geographic locations.

16. The computing device of claim 11, wherein the instructions, when executed by the one or more processors, further cause the computing device to determine the predicted likelihood that the person will move the residence based on the first set of ranked nodes and the second set of ranked nodes.

17. A non-transitory machine-readable medium storing instructions that, when executed by one or more processors, cause the one or more processors to perform steps comprising:
- obtaining location data indicating a set of geographic locations and a set of times that a person was at each of the geographic locations;
- generating a first graph data comprising a first set of nodes and edges therebetween, and a second graph data comprising a second set of nodes and edges therebetween;
- ranking, based on amounts of time the person spent at a first set of geographic locations associated with the first graph data, the first set of nodes to produce a first set of ranked nodes;
- ranking, based on amounts of time the person spent at a second set of geographic locations associated with the second graph, the second set of nodes to produce a second set of ranked nodes;
- determining haversine distances between the first set of geographic locations corresponding to the first set of ranked nodes and the second set of geographic locations corresponding to the second set of ranked nodes;
- determining, based on the haversine distances and with a logistic machine classifier, a predicted likelihood that the person will move a residence;
- obtaining a ground truth label indicating if the person moved the residence; and
- retraining the machine classifier based on the haversine distance, the predicted likelihood, and the ground truth label.

18. The non-transitory machine-readable medium of claim 17, wherein the instructions, when executed by one or more processors, further cause the one or more processors to determine the predicted likelihood by:
- summing the haversine distances to produce a sum of the haversine distances; and
- determining the predicted likelihood based on the sum of the haversine distances.

19. The non-transitory machine-readable medium of claim 17, wherein the predicted likelihood that the person will move the residence is based on the first set of ranked nodes and the second set of ranked nodes.

20. The non-transitory machine-readable medium of claim 17, wherein the instructions, when executed by the one or more processors, cause the one or more processors to determine the predicted likelihood based on a frequency of time the person spent at the first set of geographic locations and a frequency of time the person spent at the second set of geographic locations.

* * * * *